United States Patent
Jang et al.

(10) Patent No.: US 9,886,219 B2
(45) Date of Patent: Feb. 6, 2018

(54) STORAGE DEVICE INCLUDING NONVOLATILE MEMORY DEVICE AND METHOD OF PROGRAMMING THE SAME

(71) Applicants: Hyoungsuk Jang, Suwon-si (KR); Dukyoung Yun, Hwaseong-si (KR)

(72) Inventors: Hyoungsuk Jang, Suwon-si (KR); Dukyoung Yun, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 59 days.

(21) Appl. No.: 14/935,717

(22) Filed: Nov. 9, 2015

(65) Prior Publication Data

US 2016/0147482 A1   May 26, 2016

(30) Foreign Application Priority Data

Nov. 26, 2014 (KR) ........................ 10-2014-0166536

(51) Int. Cl.
  *G06F 12/00* (2006.01)
  *G06F 3/06* (2006.01)
  *G06F 12/02* (2006.01)

(52) U.S. Cl.
  CPC ............ *G06F 3/0679* (2013.01); *G06F 3/061* (2013.01); *G06F 3/0656* (2013.01); *G06F 12/00* (2013.01); *G06F 12/0238* (2013.01); *G06F 12/0246* (2013.01); *G06F 12/0253* (2013.01); *G06F 12/0269* (2013.01); *G06F 12/0276* (2013.01);
  (Continued)

(58) Field of Classification Search
  CPC ...... G06F 3/0679; G06F 3/061; G06F 3/0656; G06F 12/00; G06F 12/0238; G06F 12/0246; G06F 12/0253; G06F 12/0269; G06F 12/0276; G06F 2212/7203; G06F 2212/7204; G06F 2212/7205
  See application file for complete search history.

(56) References Cited

U.S. PATENT DOCUMENTS 7,562,183 B2   7/2009 Kwon
7,679,133 B2   3/2010 Son et al.
(Continued)

FOREIGN PATENT DOCUMENTS

KR           10-0546348 B1     1/2006
KR       10-2008-0021397 A     3/2008
(Continued)

*Primary Examiner* — Shawn X Gu
(74) *Attorney, Agent, or Firm* — Harness, Dickey & Pierce, P.L.C.

(57) ABSTRACT

According to example embodiments, a storage device in accordance includes a nonvolatile memory device and a memory controller. The nonvolatile memory device includes memory blocks divided into a buffer region and a main region. The memory controller is configured to control the nonvolatile memory device to perform a buffer program operation that includes storing data provided from the outside in the buffer region, to perform a main program operation that includes storing data provided from the outside in the main region, and to perform a closing program operation that includes writing data stored in the buffer region in the main region such the that at least part of the data stored in the buffer region is written to open pages of a memory block including a page programmed last in the main program operation.

18 Claims, 12 Drawing Sheets

(52) U.S. Cl.
CPC ............... *G06F 2212/7203* (2013.01); *G06F 2212/7204* (2013.01); *G06F 2212/7205* (2013.01)

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,654,587 B2 | 2/2014 | Yoon et al. |
| 8,681,554 B2 | 3/2014 | Suzuki |
| 2008/0028133 A1 | 1/2008 | Kwon |
| 2009/0121271 A1 | 5/2009 | Son et al. |
| 2009/0201735 A1 | 8/2009 | Park |
| 2010/0023672 A1* | 1/2010 | Gorobets ............ G06F 12/0246 711/103 |
| 2011/0216603 A1 | 9/2011 | Han et al. |
| 2011/0233648 A1 | 9/2011 | Seol et al. |
| 2012/0051143 A1 | 3/2012 | Yoon et al. |
| 2012/0320673 A1 | 12/2012 | Kwak |
| 2013/0051144 A1 | 2/2013 | Suzuki |
| 2013/0279262 A1 | 10/2013 | Yoon et al. |
| 2013/0326125 A1* | 12/2013 | Chang ................ G06F 12/0246 711/103 |
| 2014/0019670 A1 | 1/2014 | Huang |
| 2014/0022846 A1 | 1/2014 | Kim |
| 2014/0068144 A1 | 3/2014 | Fai |
| 2014/0119115 A1 | 5/2014 | Jung et al. |
| 2014/0133235 A1 | 5/2014 | Kim |
| 2014/0156964 A1 | 6/2014 | Choi |
| 2014/0162418 A1* | 6/2014 | Keshav ............. H01L 29/66825 438/268 |
| 2015/0221381 A1 | 8/2015 | Nam |
| 2015/0332770 A1 | 11/2015 | Kim |
| 2015/0332772 A1 | 11/2015 | Kim et al. |

FOREIGN PATENT DOCUMENTS

| | | |
|---|---|---|
| KR | 10-2008-0100079 A | 11/2008 |
| KR | 10-0935593 B1 | 1/2010 |
| KR | 10-1050339 B1 | 7/2011 |
| KR | 10-2012-0138895 A | 12/2012 |
| KR | 10-1351550 B1 | 1/2014 |
| KR | 10-2014-0055445 A | 5/2014 |
| KR | 10-2014-0072639 A | 6/2014 |
| KR | 10-2015-0091670 A | 8/2015 |
| KR | 20150130634 A | 11/2015 |
| KR | 20150130638 A | 11/2015 |

* cited by examiner

STORAGE DEVICE INCLUDING NONVOLATILE MEMORY DEVICE AND METHOD OF PROGRAMMING THE SAME

CROSS-REFERENCE TO RELATED APPLICATIONS

This U.S. non-provisional patent application claims priority under 35 U.S.C. § 119 to Korean Patent Application No. 10-2014-0166536, filed on Nov. 26, 2014, the entire contents of which are hereby incorporated by reference.

BACKGROUND

The present disclosure relates to semiconductor memory devices, and more particularly, to a storage device including a nonvolatile memory device and/or a method of programming the same.

A semiconductor memory device may be classified into a volatile semiconductor memory device and a nonvolatile semiconductor memory device. A volatile semiconductor memory device has a high read and write speed but loses its stored data when a power supply is interrupted. A nonvolatile semiconductor memory device retains its stored data even when a power supply is interrupted. Thus, a nonvolatile semiconductor memory device may be used to remember contents that should be retained regardless of whether power is supplied or not.

Examples of a nonvolatile semiconductor memory devices include a MROM (mask read only memory), a PROM (programmable ROM), a EPROM (erasable PROM), a EEPROM (electrically EPROM), etc.

A typical example of a nonvolatile semiconductor memory device includes a flash memory device. Flash memory devices are being widely used as storage medium for voice data or video data of an information device such as a computer, a cellular phone, a PDA(personal digital assistant), a digital camera, a camcorder, a voice recorder, a MP3 player, a handheld PC, a game machine, a fax scanner, a printer, etc.

As demand for high capacity of a memory device increases these days, a MLC (multi-level cell) or a multi-bit memory device storing multiple bits in one memory cell is becoming common.

SUMMARY

According to example embodiments, a program method of operating a memory controller of a storage device including a nonvolatile memory device may include performing a buffer program operation that includes storing a size set of data input from the outside in a buffer region of the nonvolatile memory device; performing a main program operation that includes storing data input from the outside in a main region of the nonvolatile memory device after the buffer program operation; and performing a closing program operation that includes writing data stored in the buffer region to open pages of a memory block of the main region including a page programmed last after the main program operation is finished.

In example embodiments, the size set of data may correspond to an erase unit of the main region.

In example embodiments, the performing the buffer program operation may include managing the buffer region using a single level cell method, and the performing the main and closing program operations may include managing the main memory region using a multi level cell method.

In example embodiments, the performing the main and closing program operations may include managing the main region using a triple level cell (TLC) method.

In example embodiments, the buffer and main program operations may include using continuously input data being from the outside.

In example embodiments, the nonvolatile memory device may include a plurality of memory blocks on a substrate, the memory blocks may each include a plurality of strings on the substrate, and each of the strings may include a plurality of memory cells stacked on top of each other in a direction perpendicular to the substrate.

In example embodiments, the closing program operation may be performed after the main program operation is finished.

In example embodiments, the closing program operation may be performed within a threshold time after the main program operation is finished.

In example embodiments, the threshold time may be less than an erase program interval of the nonvolatile memory device.

According to example embodiments, a program method of a nonvolatile memory device including first and second buffer regions managed by a single level cell method and a main region managed by a multi level cell method is provided. The program method may include performing a first program operation that includes storing a size set of data input from the outside in the first buffer region; performing a second program operation that includes storing being input from the outside in the second buffer region; performing a third program operation that includes storing data written in the second buffer region in the main region; and performing a fourth program operation that includes writing data programmed in the first buffer region in open pages of a memory block including a page programmed in the main region last.

In example embodiments, the size set of data may correspond to an erase unit of the main region.

In example embodiments, the data being input from the outside may be continuously input from the outside during the performing the first to third program operations.

In example embodiments, the nonvolatile memory device may include a plurality of memory blocks on a substrate, the memory blocks each include a plurality of strings on the substrate, and each of the strings may include a plurality of memory cells stacked on top of each other in a direction perpendicular to the substrate.

In example embodiments, the fourth program operation may be performed immediately or within a threshold time after the third program operation is finished.

In example embodiments, the threshold time may be an erase program interval of the nonvolatile memory device.

According to example embodiments of inventive concepts, a storage device may include a nonvolatile memory device and a memory controller. The nonvolatile memory device includes memory blocks divided into a buffer region and a main region. The memory controller is configured to control the nonvolatile memory device to perform a buffer program operation that includes storing data provided from the outside in the buffer region, to perform a main program operation that includes storing data provided from the outside in the main region, and to perform a closing program operation that includes writing data stored in the buffer region to the main region such that at least part of the data stored in the buffer region is written to open pages of a memory block including a page programmed last in the main program operation.

In example embodiments, the memory controller may be configured to control the buffer operation to store a size of data that corresponds to an erase unit of the main region.

In example embodiments, the memory controller may be configured to control the nonvolatile memory device to perform the closing operation after the main program operation is finished.

In example embodiments, the memory blocks may each include a plurality of strings on a substrate. Each of the strings may include a plurality of memory cells stacked on top of each other in a direction perpendicular to the substrate.

In example embodiments, the memory blocks may include memory cells. The memory controller may be configured to manage the memory cells in the buffer region as single level cells and the memory controller may be configured to mange the memory cells in the main region as multi level cells.

According to example embodiments of inventive concepts, a program method may include performing a first program operation that includes storing a size set data input from the outside in a first memory region of a nonvolatile memory device, performing a second program operation that includes storing data input from the outside in a second memory region of the nonvolatile memory device after the first program operation, and performing a third program operation that includes writing data stored in the first memory region to open pages of a memory block of the second memory region including a page programmed last after the second program operation is finished.

In example embodiments, the size set of data may correspond to an erase unit of the second memory region.

In example embodiments, the performing the first program operation may include managing the first memory region using a single level cell method. The performing the second and third program operations may include managing the second memory region using a multi level cell method.

In example embodiments, the performing the second and third program operations may include managing the second memory region using a triple level cell (TLC) method.

In example embodiments, the first and second program operations may include using continuously input data from the outside.

In example embodiments, the nonvolatile memory device may include a plurality of memory blocks on a substrate. The memory blocks may each include a plurality of memory cells stacked on top of each other in a direction perpendicular to the substrate.

Example embodiments of inventive concepts also relate to a program method of a nonvolatile memory device including first and second buffer regions managed by a single level cell method and a main region managed by a multi level cell method. The program method may include performing a first program operation that includes storing a size set of data input from the outside in the first buffer region, performing a second program operation that includes storing data input from the outside in the second buffer region; performing a third program operation that includes storing data written in the second buffer region in the main region; and performing a fourth program operation that includes writing data programmed in the first buffer region in open pages of a memory block including a page programmed in the main region last.

In example embodiments, the size set of data may correspond to an erase unit of the main region.

In example embodiments, the data being input from the outside may be continuously input from the outside during the performing the first to third program operations.

In example embodiments, the nonvolatile memory device may include a plurality of memory blocks on a substrate. The memory blocks may each include a plurality of strings on the substrate. Each of the strings may include a plurality of memory cells stacked on top of each other in a direction perpendicular to the substrate.

According to example embodiments of inventive concepts, a method of programming a nonvolatile memory device is provided. The nonvolatile memory device includes a plurality of memory blocks. The memory blocks include first memory blocks and second memory blocks that each include memory cells. The method includes programming data into the first memory blocks until a size set of data is programmed in the first memory blocks; programming data into the second memory blocks, the programming data into the second memory blocks resulting in closed pages and at least one open page in the second memory blocks, the closed pages being programmed with data, the at least one open page being not programmed with data; and programming the at least one open page in the second memory blocks using at least part of the data stored in the first memory blocks until the at least one open page becomes fully programmed and is included as one of the closed pages in the second memory blocks.

In example embodiments, the programming data into the first memory blocks may be performed until the size set of data corresponds to an erase unit of the second memory blocks and is programmed into the first memory blocks.

In example embodiments, the programming data into the first memory blocks may include programming the memory cells in the first memory blocks to each store N bit(s) of data per memory cell. The programming data into the second memory blocks may include programming the memory cells of the closed pages to each store X bits of data per memory cell. The programming the at least one page may include programming the memory cells of the at least one open page to each store X bits of data per memory cell. N may be an integer greater than or equal to 1, and X may be an integer greater than N.

In example embodiments, the memory cells of the first and second memory blocks may be organized into a plurality of strings, and each of the strings may include a group of the plurality of memory cells that are stacked on top of each other in a vertical direction.

In example embodiments, the nonvolatile memory device may be part of a storage device that includes a memory controller that is configured to control the nonvolatile memory device. The programming data into the first memory blocks may include using the memory controller to control the nonvolatile memory device so that data received from a host external to the storage device is written into the first memory blocks until the size set of data is programmed in the first memory blocks. The programming data into the second memory blocks may include using the memory controller to control the nonvolatile memory device so that data received from the host is programmed into the second memory blocks, resulting in the closed pages and the at least one open page. The programming the at least one open page in the second memory blocks may include using the memory control to control the nonvolatile memory device during the programming the at least one open page in the second memory blocks and immediately performing the programming the at least one page after the programming data into the second memory blocks is finished.

BRIEF DESCRIPTION OF THE FIGURES

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION OF EXAMPLE EMBODIMENTS

Figure 1:
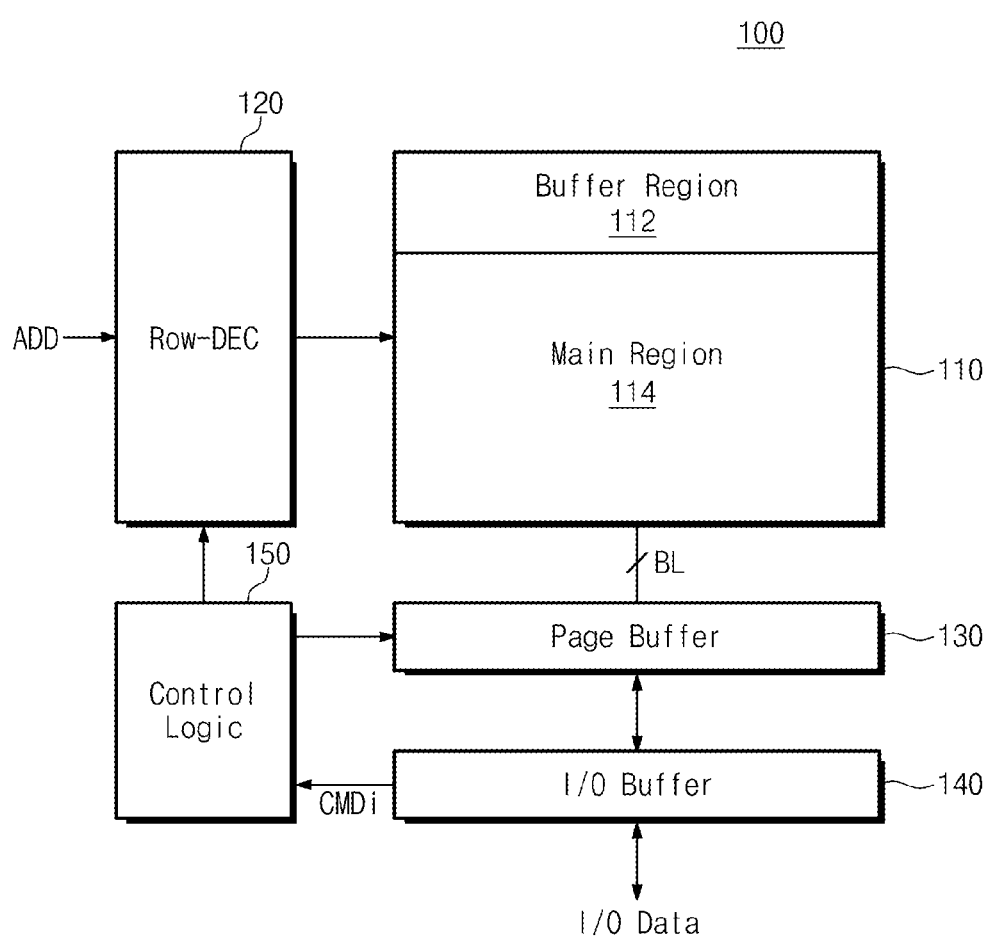
FIG. 1 is a block diagram illustrating a nonvolatile memory device in accordance with example embodiments of inventive concepts.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

FIG. 1 is a block diagram illustrating a nonvolatile memory device 100 in accordance with example embodiments of inventive concepts. Referring to FIG. 1, a cell array 110 of the nonvolatile memory 100 includes a buffer region 112 and a main region 114.

The cell array 110 is connected to a row decoder 120 through word lines WLs and/or select lines SSL and GSL. The cell array 110 is connected to a page buffer 130 through at least one bit line BL. The cell array 110 includes a plurality of NAND type cell strings. A memory region constituting the cell array 110 may be classified into a buffer region 112 and a main region 114. Each of the buffer region 112 and the main region 114 includes a plurality of memory blocks.

In a program operation, data being continuously input from the outside may be programmed in the buffer region 112 as much as a size set. The set size may be a size corresponding to an erase unit of the main region 114. After that, in the case that data is continuously input, data being input is programmed in the main region 114. That is, after data is programmed in the buffer region 112 first as much as the size set, data bypasses the buffer region 112 to be programmed in the main region 114. In the case that a program in the main region 114 is over, some of data programmed in the buffer region 112 are programmed in the main region 114. Generally, in a program operation, some of pages of a memory block including a page programmed last are likely to have an open state (e.g., a state not programmed). That is, after a main program operation is finished, some of pages of a specific memory block are likely to stay in an open state. The nonvolatile memory device 100 programs data programmed in the buffer region 112 to pages of an open state among pages of the memory block. Thus, all the pages of the memory block of the main region 114 programmed last after a program operation is finished become a closed state (e.g., a programmed state).

An operation of programming data in the buffer region 112 is called a buffer program operation BP, an operation of programming data in the main region 114 after the buffer program operation BP is called a main program operation MP and an operation of moving data programmed in the buffer region 112 to the main region 114 is called a closing program operation CP.

The main program operation MP may be performed according to address information relevant to data being input. A minimum program unit with respect to the buffer region 112 and a minimum program unit with respect to the main region 114 may be variously determined according to a program method, the number of bits of data being stored per cell, etc. According to example embodiments of inventive concepts, a minimum program unit with respect to the buffer region 112 may be different from a minimum program unit with respect to the main region 114.

According to example embodiments of inventive concepts, memory blocks of the cell array 110 may be divided into the buffer region 112 and the main region 114. The memory regions 112 and 114 may be not physically divided but may be logically divided. That is, the memory regions 112 and 114 can be logically changed. Memory blocks that belong to the buffer region 112 may be programmed in different method from memory blocks that belong to the main region 114. For example, the memory blocks that belong to the buffer region 112 may be programmed according to a SLC (single level cell) program method. The memory blocks that belong to the main region 114 may be programmed according to a MLC (multi level cell) program method.

The memory blocks that belong to the buffer region 112 and the memory blocks that belong to the main region 114 may be programmed according to the MLC (multi level cell) program method. For example, each of the memory blocks that belong to the buffer region 112 stores 2-bit data and each of the memory blocks that belong to the main region 114 may store N-bit data (N is an integer which is three or more). Each of the memory blocks that belong to the buffer region 112 may store the number of bits smaller than N bits (N is an integer which is three or more) being stored in each of the memory blocks that belong to the main region 114.

A row decoder 120 can select any one of the memory blocks of the cell array 110 in response to an address ADD. The row decoder 120 can select any one of word lines of a selected memory block. The row decoder 120 transmits a word line voltage VWL to word lines of the selected memory block. The row decoder 120 transmits select signals to select lines (for example, SSL or GSL) of selected memory block. The row decoder 120 can transmit a program voltage Vpgm and a verify voltage Vvfy to a selected word line and transmit a pass voltage Vpass to an unselected word line.

A page buffer 130 operates as a write driver or a sense amplifier depending on an operation mode. In a program operation, the page buffer 130 transmits a bit line voltage corresponding to data to be programmed to a bit line of the cell array 110. In a read operation, the page buffer 130 senses data stored in a selected memory cell through a bit line. The page buffer 130 can latch sensed data to output it to the outside.

An input/output buffer 140, in a program operation, transmits write data being input to the page buffer 130. The input/output buffer 140, in a read operation, outputs read data being provided from the page buffer 130 to the outside. The input/output buffer 140 transmits an address or command being input to control logic 150 or the row decoder 120.

The control logic 150 controls the page buffer 130 in response to a command CMD and an address ADDR being transmitted from the input/output buffer 140. The control logic 150 performs a control operation for accessing a selected memory region in response to a write command, a read command and an erase operation being provided through the input/output buffer 140.

As the number of bits of data being stored per memory cell constituting the nonvolatile memory device increases, an EPI (erase program interval) problem is being magnified. The EPI means that after a specific memory block is erased, time elapsed until the program is completed from the first word line to the last word line should be managed within specific time. In the case that the EPI exceeds the specific time, a memory cell may be deteriorated and data reliability may be degraded. In a program operation of a nonvolatile memory device being erased by a block unit and being programmed by a page unit, the EPI problem may occur. This is because after a program operation is completed, it is likely that some of pages of a memory block on which the last program operation is performed may be in a state not programmed, that is, an open state. In the case of leaving pages of open state as it is, a characteristic of a corresponding memory block is deteriorated and thereby data reliability of the nonvolatile memory device may be degraded.

According to example embodiments of inventive concepts, the nonvolatile memory device 100 stores data being input in the buffer region 112 as much as a size set. In the case that data is continuously being input even after that, data being input is immediately stored in the main region 114. That is, the data bypasses the buffer region 112 to be stored in the main region 114. Immediately after the main program operation MP is finished, all the pages of a memory block of the main region 114 maintain a programmed state by programming data programmed in the buffer region 112 to the main region 114. Thus, since the nonvolatile memory device 100 can manage time within a very short space of time that all the pages are programmed after a memory block is erased, the EPI problem can be fundamentally solved and/or reduced.

Figure 2:
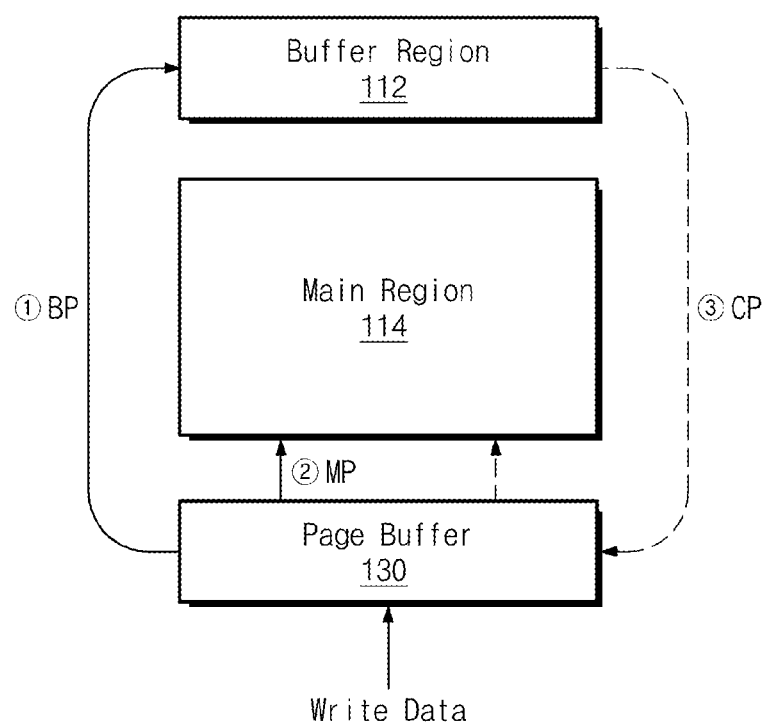
FIG. 2 is a block diagram illustrating a program order of a nonvolatile memory device of FIG. 1.

FIG. 2 is a block diagram illustrating a program order of a nonvolatile memory device of FIG. 1. Referring to FIG. 2, the nonvolatile memory device 100 programs write data being provided from the outside in the buffer region 112 first as much as a size set (①). In the case that write data is continuously being input even after that, the nonvolatile memory device 100 programs the write data being input in the main region 114 (②). If it is judged that the program operation (②) is finished, the nonvolatile memory device 100 programs data programmed in the buffer region 112 to an unoccupied region (e.g., region not programmed) of a memory block that belongs to a page programmed last (③), where the unoccupied region may be in the main region 114. A program operation with respect to the buffer region 112 is called a BP (buffer program operation). A program operation with respect to the main region 114 is called a MP (main program operation). Performing a program operation on the main region 114 using data programmed in the buffer region 112 is called a CP (closing program operation).

Memory cells corresponding to the buffer region 112 may be constituted by a SLC (single level cell). Thus, 1-bit data is stored in each of memory cells corresponding to the buffer region 112. A write speed or data reliability with respect to the buffer region 112 constituted by a SLC is higher than that of the main region 114 constituted by a MLC (multi level cell). There is almost no EPI problem in memory blocks of the buffer region 112 managed by a SLC.

To perform a buffer program operation on the buffer region 112, write data is input from the outside. The write data is loaded into the page buffer 130. In the buffer program operation, the write data stored in the page buffer 130 is programmed in the buffer region 112. If data of page unit (for example, 2K byte) is loaded into the page buffer 130, the page buffer 130 can program data loaded into the buffer region 112. Data being programmed in the buffer region 112 may be written by a SLC method. In this way, data may be programmed in the buffer region 112 by a plurality of page units. That procedure is indicated by a data path (①).

In example embodiments of inventive concepts, the buffer program operation BP may program data being input in the buffer region 112 as much as a size set. The size set may be differently set depending on a storage method of the main region 114. Three memory blocks constituted by a SLC (single level cell) correspond to one memory block constituted by a TLC (triple level cell). If the main region 114 stores data in a TLC method, the buffer program operation BP programs write data as much as a size corresponding to three memory blocks of the buffer region 112.

In the case that write data is continuously input even after write data as much as the size set is programmed in the buffer region 112, the nonvolatile memory device 100 may program write data being input to the main region 114. The page buffer 130 can program data being input to the main region 114. The data being programmed in the main region 114 may be written by a MLC method.

In the case that the main program operation MP is finished, the nonvolatile memory device 100 programs data programmed in the buffer region 112 to the main region 114. In the case that write data is not further input from the outside for a certain period of time, it may be judged that the main program operation MP is finished. It is likely that a memory block of the main region 114 including a page programmed last may be vacant. After the main program operation MP is finished, the nonvolatile memory device 100 may program data programmed in the buffer region 112 into a region not programmed of a memory block (e.g., a not programmed region in the main region). Thus, in the case that a program operation is completed, all pages of the memory block become a close state, that is, a programmed state.

An example above is described where the buffer region 112 was managed by a SLC method but inventive concepts are not limited thereto and may be applied to nonvolatile memory devices in which the number of bits being stored per cell in the buffer region 112 is greater than 1 and less than number of bits being stored per cell in the main region 114. In other words, the memory cells in the buffer region 112 may be programmed to store N bits (where N is an integer greater than or equal to 1) provided that the memory cells in the main region 114 are programmed to store X bits per memory cell (where X is an integer that is greater than N).

The buffer program operation BP programs data of a size corresponding to an erase unit of the main region 114, that is, a block size of the main region 114 to the buffer region 112. In the case that data is programmed in the buffer region 112 as much as a size set, the main program operation MP bypasses the buffer region 112 to directly program data being input to the main region 114. The closing program operation CP, after a program operation of the main region 114 is finished, programs data programmed in the buffer region 112 to pages of a memory block which are not programmed and vacant. Every time a program operation of the nonvolatile memory device 100 is finished, all the pages of a memory block exist as a programmed state and thereby a reliability degradation problem of data due to EPI can be limited and/or prevented.

Figure 3:
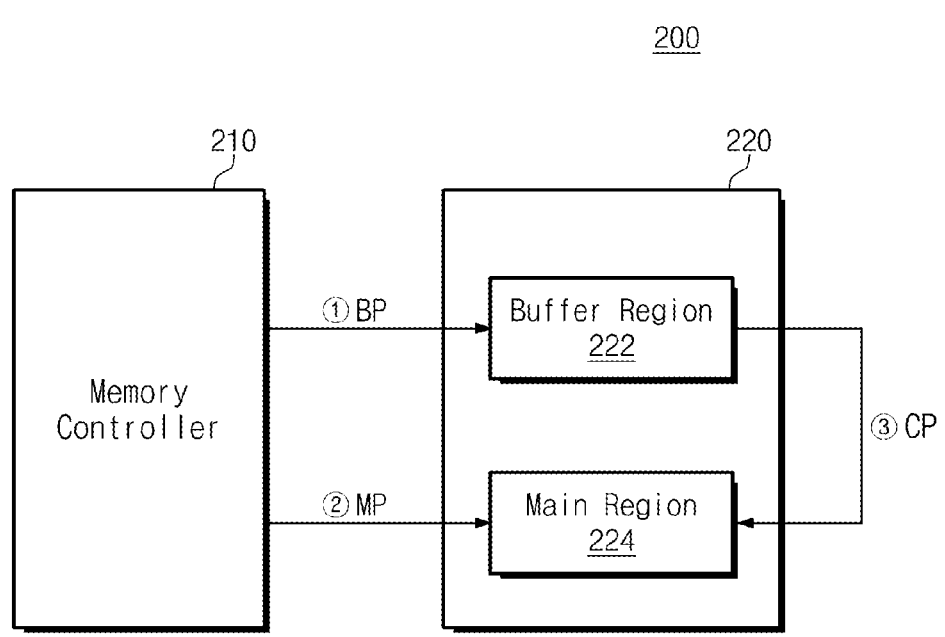
FIG. 3 is a block diagram illustrating a storage device in accordance with example embodiments of inventive concepts.

FIG. 3 is a block diagram illustrating a storage device in accordance with example embodiments of inventive concepts. Referring to FIG. 3, the storage device 200 may include a memory controller 210 and a nonvolatile memory device 220.

The memory controller 210 can control the nonvolatile memory device 220 in response to a request (for example, a write request, a read request, etc.) from the outside (for example, a host). The memory controller 210 can control the nonvolatile memory device 220 in response to an internal request (for example, an operation relevant to sudden power-off, a wear-leveling operation, a read reclaim operation, etc.) without an external request. An operation corresponding to the internal request of the memory controller 210 can be performed within a timeout period of a host after a request of the host is processed. An operation corresponding to the internal request of the memory controller 210 can be performed during an idle time of the memory controller 210. The nonvolatile memory device 220 operates in response to a control of the memory controller 210 and may be used as a storage medium storing data. The storage medium may be constituted by one or more memory chips. The nonvolatile memory device 220 can communicate with the memory controller 210 through one or more channels. The nonvolatile memory device 220 may include a NAND flash memory device.

The storage device 200 programs data to the nonvolatile memory device 220, using the buffer program operation BP, the main program operation MP and the closing program operation CP. The nonvolatile memory device 220 may include a memory cell array having a buffer region 222 and a main region 224. The buffer region 222 may be constituted by memory blocks storing 1-bit data per cell. The main region 224 may be constituted by memory blocks storing 3-bit data per cell. However, as described above, example embodiments are not limited thereto and the memory cells in the buffer region 112 may alternatively be programmed to store N bits (where N is an integer greater than 1) provided that the memory cells in the main region 114 are programmed to store at least N+1 bits per memory cell.

In the case that a program operation is performed, the memory controller 210 controls the nonvolatile memory device 220 so that write data is programmed (①) in the buffer region 222 first. The memory controller 210 can control the nonvolatile memory device 220 so that data as much as a size corresponding to an erase unit of the main region 224 is programmed in the buffer region 222.

In the case that write data is continuously input even after data as much as the size set is programmed in the buffer region 222, the memory controller 210 controls the nonvolatile memory device 220 so that write data being input is programmed (②) in the main region 224. The memory controller 210 judges whether a program operation with respect to the main region 224 is finished. In the case that it is judged that a program operation with respect to the main region 224 is finished, the memory controller 210 controls the nonvolatile memory device 220 so that data programmed in the buffer region 222 is programmed in the main region 224. The memory controller 210 controls the nonvolatile memory device 220 so that data programmed (③) in the buffer region 222 is programmed to pages not programmed among pages included in a memory block of the main region 224 programmed last. That is, the memory controller 210 programs all the pages not programmed of the memory block that may occur depending on a program operation, using the data programmed in the buffer region 222. Thus, a memory block including pages not programmed that may occur depending on a program operation can be limited and/or prevented from being generated.

Figure 4:
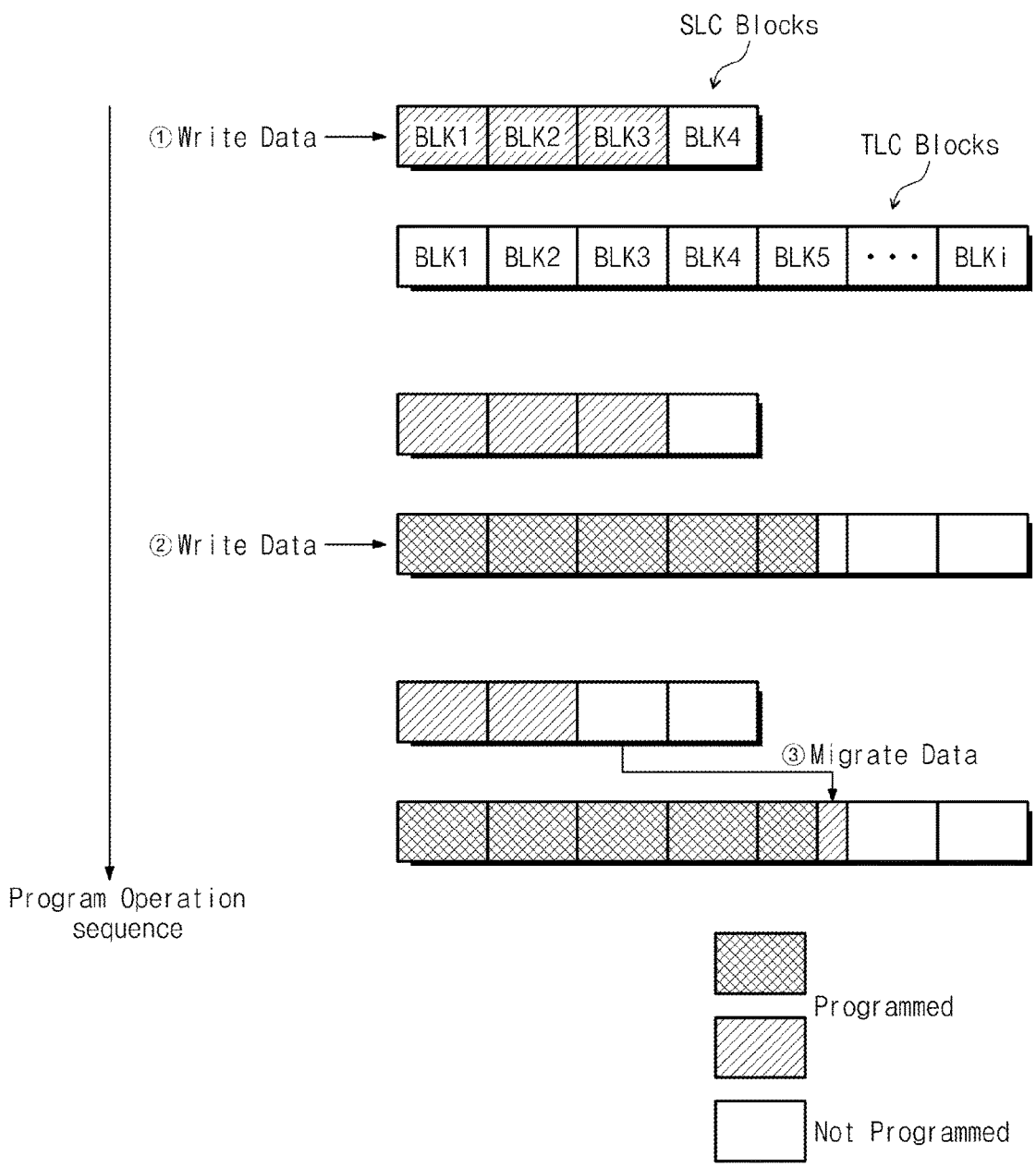
FIG. 4 is a drawing illustrating a program operation in accordance with example embodiments of inventive concepts in further detail.

FIG. 4 is a drawing illustrating a program operation in accordance with example embodiments of inventive concepts in further detail. Referring to FIG. 4, single level cell (SLC) blocks constituting a buffer region and triple level cell (TLC) constituting a main region are illustrated as an illustration. A method that 1-bit data is programmed per memory cell in the buffer region and 3-bit data is programmed per memory cell in the main region will be described.

Write data is programmed in memory blocks of the buffer region first. Generally, the amount of data that can be programmed in a memory block of the TLC method can be programmed in three memory blocks of the SLC method. Thus, the buffer program operation (①) is performed until write data being input fills all three memory blocks BLK1, BLK2 and BLK3 of the buffer region.

In the case that all three memory blocks BLK1, BLK2 and BLK3 of the buffer region are filled with write data, write data being input is programmed (②) in memory blocks BLK1, BLK2, . . . , BLKi of the main region. Since a program operation is performed by page unit, some of pages of a memory block may exist as a state not programmed after the program operation is finished. In the case that a certain period of time has elapsed while the pages are still in the state not programmed, a characteristic of a memory cell becomes worse and thereby data reliability may be affected and/or reduced. Thus, it may be desirable to limit and/or prevent deterioration of a memory cell by programming pages of an open state that may occur depending on a program operation.

The program method according to example embodiments of inventive concepts can limit and/or prevent pages of an open state from existing by programming (③) data programmed in the buffer region to the main region immediately after a program operation with respect to the main region is finished (or instead of immediately after, data programmed in the buffer region may alternatively be programmed into the main region within a threshold time after a program operation with respect to the main region is finished). Referring to FIG. 4, a program operation with respect to the main region is finished in the block BLK5 among TLC blocks and some parts of the block BLK5 exist as a state not programmed. An operating method of a nonvolatile memory device according to example embodiments of inventive concepts programs pages of an open state, using data programmed in the SLC blocks. Among data programmed in the SLC blocks, data as much as a size corresponding to a region that exists as a state not programmed in the TLC block is programmed in the TLC block. That is, vacant regions (regions not programmed) among the TLC blocks are filled (programmed) using data stored on the SLC blocks. According to example embodiments of inventive concepts, it can be limited and/or prevented in a program operation of a storage device, some parts of a specific memory block of the main region exist as a programmed state and some other parts of the specific memory block of the main region exist as a state not programmed.

FIGS. 5A through 5D are drawings for explaining various combinations with respect to a buffer region and a main region of a storage device in accordance with example embodiments of inventive concepts. In the drawings, "BP" represents a buffer program operation with respect to the buffer region 222, "MP" represents a main program operation with respect to the main region 224 and "CP" represents a closing program operation with respect to the main region 224.

As described above, the storage device includes the memory controller 210 and the nonvolatile memory device 220. The nonvolatile memory device 220 includes the buffering region 222 buffering data and the main region 224 storing data. The buffer region 222 and the main region 224 constitute a memory cell array of the nonvolatile memory device 220. Although not illustrated in the drawings, the memory cell array may include more regions (for example, a meta region, a preliminary region, etc.). The memory regions of the memory cell array may be divided not physically but logically. This means that memory regions are defined according to an address mapping of the memory controller 210.

Figure 5A:
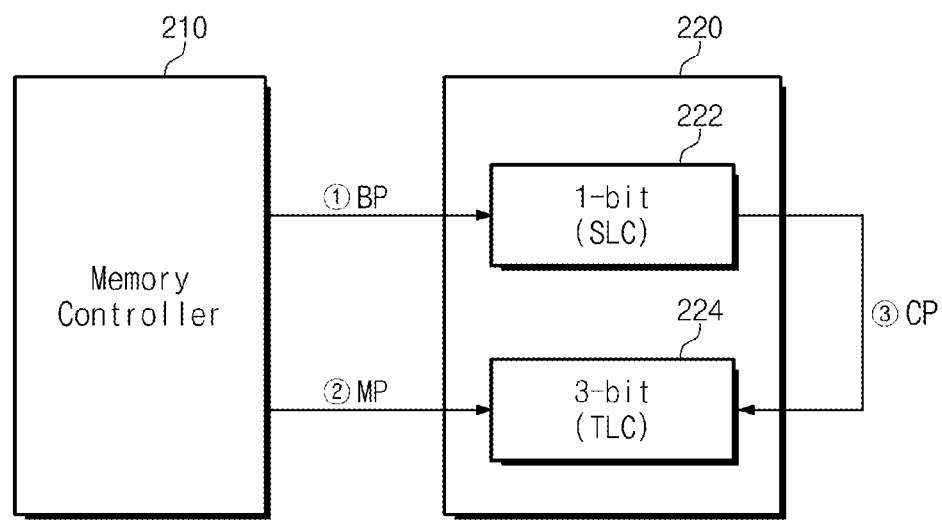
FIGS. 5A through 5D are drawings for explaining various combinations with respect to a buffer region and a main region of a storage device in accordance with example embodiments of inventive concepts.

Referring to FIG. 5A, in the case of a storage device storing 3-bit data per cell, the buffer region 222 may be constituted by memory blocks of memory cells each storing 1-bit data and the main region 224 may be constituted by memory blocks of memory cells each storing 3-bit data. In this case, the buffer program operation BP may be performed according to a SLC program method. The main program operation MP and the closing program operation CP may be performed according to a TLC program method.

Figure 5B:
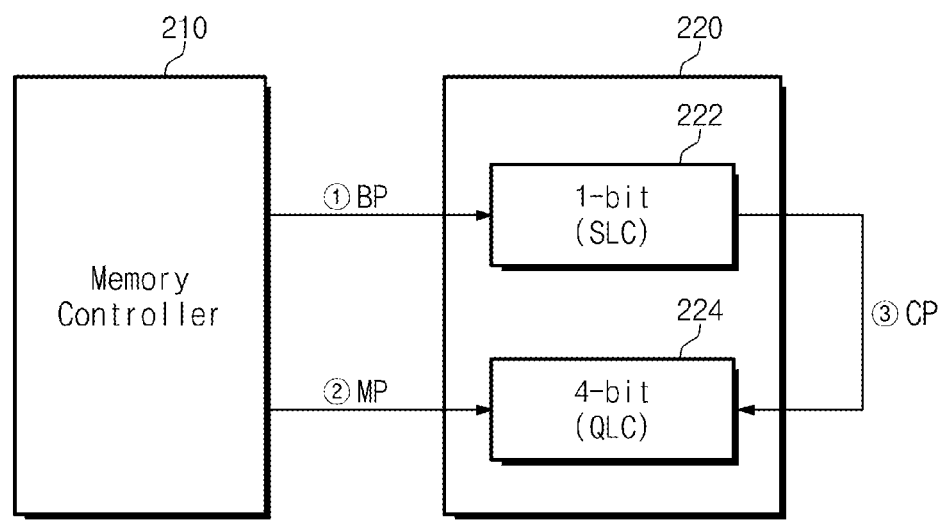

Referring to FIG. 5B, in the case of a storage device storing 4-bit data per cell, the buffer region 222 may be constituted by memory blocks of memory cells each storing 1-bit data and the main region 224 may be constituted by memory blocks of memory cells each storing 4-bit data. In this case, the buffer program operation BP may be performed according to the SLC program method. The main program operation MP and the closing program operation CP may be performed according to a QLC program method.

Figure 5C:
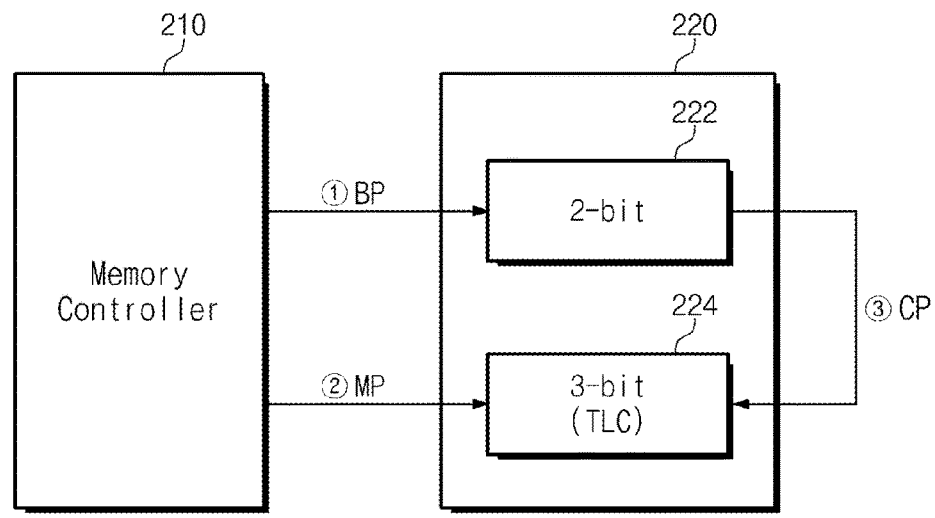

Referring to FIG. 5C, in the case of a storage device storing 3-bit data per cell, the buffer region 222 may be constituted by memory blocks of memory cells each storing 2-bit data and the main region 224 may be constituted by memory blocks of memory cells each storing 3-bit data. In this case, the buffer program operation BP may be performed according to a MLC program method. The main program operation MP and the closing program operation CP may be performed according to the TLC program method.

Figure 5D:
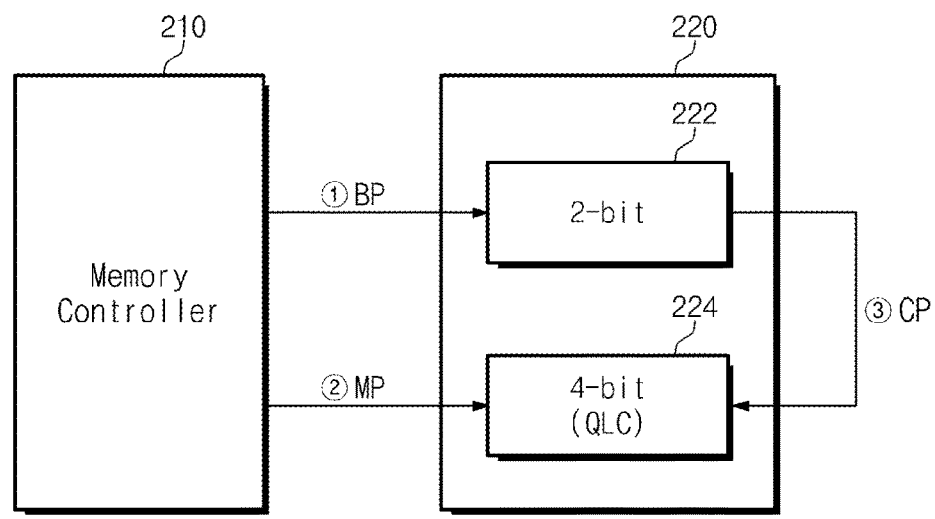

Referring to FIG. 5D, in the case of a storage device storing 4-bit data per cell, the buffer region 222 may be constituted by memory blocks of memory cells each storing 2-bit data and the main region 224 may be constituted by memory blocks of memory cells each storing 4-bit data. In this case, the buffer program operation BP may be performed according to the MLC program method. The main program operation MP and the closing program operation CP may be performed according to the QLC program method.

In example embodiments of inventive concepts, the definition of the buffer region 222 and the main region 224 illustrated in FIGS. 5A through 5D may not limited thereto. For example, in the case that a storage medium included in a storage device is constituted by a plurality of nonvolatile memory devices, each nonvolatile memory device may be constituted so that the memory cell array is divided into the buffer region 222 and the main region 224.

Figure 6:
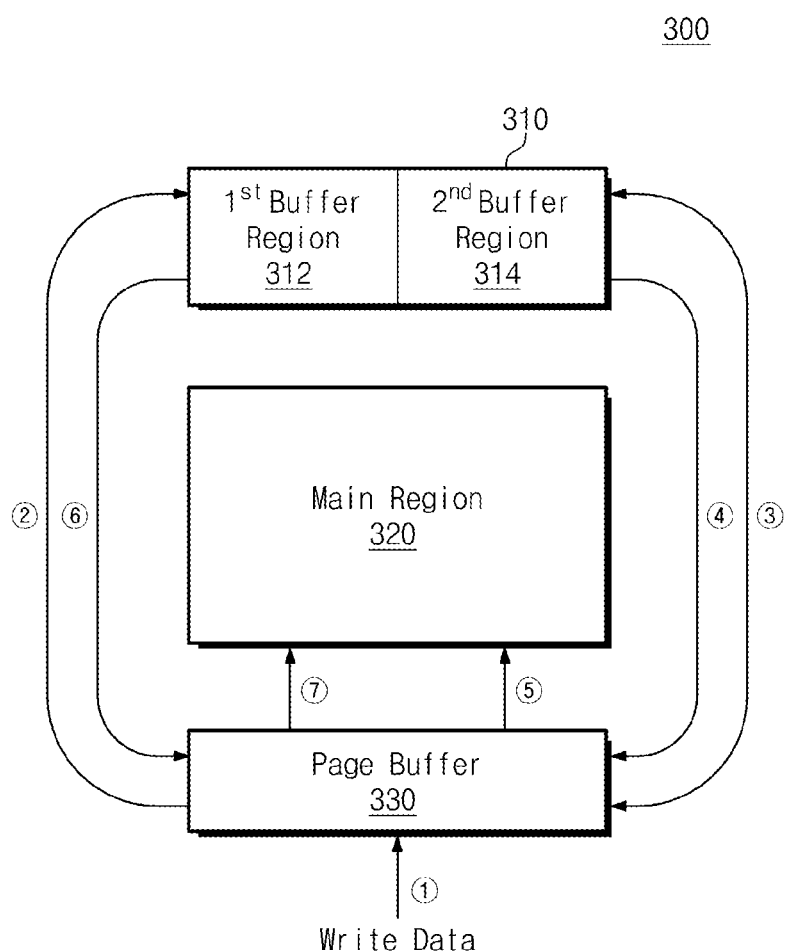
FIG. 6 is a block diagram illustrating a program operation in accordance with example embodiments of inventive concepts.

FIG. 6 is a block diagram illustrating a program operation in accordance with example embodiments of inventive concepts. Referring to FIG. 6, a nonvolatile memory device 300 programs write data being provided from the outside to a buffer region 310 and programs data programmed in the buffer region 310 to a main region 320 again.

First, in the case that a write request from the outside occurs, write data is stored in a page buffer 330. This procedure is represented by a data path (①). After that, the nonvolatile memory device 300 programs write data stored in the page buffer 330 to a first buffer region 312 of the buffer region 310 as much as a size set. This procedure is represented by a data path (②). At this time, a size of data being programmed in the first buffer region 312 may correspond to an erase unit of the main region 320. In the case that write data is continuously input even after that, the nonvolatile memory device 300 programs write data being input to a second buffer region 314. This procedure is represented by a data path (③).

Memory cells corresponding to the buffer region 310 may be constituted by a SLC (single level cell). 1-bit data is stored in each of the memory cells corresponding to the buffer region 310. A write speed and data reliability with respect to the buffer region 310 constituted by the SLC are higher than the main region 320 constituted by a MLC (multi level cell). Thus, a speed of the program operation (② and ③) with respect to the buffer region 310, that is, an operation that data is written in the buffer region 310, is relatively high. Write data is input from the outside to perform the program operation (② and ③) with respect to the buffer region 310. The write data which was input is loaded into the page buffer 330.

In the program operation with respect to the buffer region 310, write data stored in the page buffer 330 is programmed in the first buffer region 312 first. After that, data of a size set is programmed in the first buffer region 312 and then a program operation with respect to the second buffer region 314 is performed. If data of page unit (for example, 2K Byte) is loaded into the page buffer 330 first, the page buffer 330 programs data loaded in the buffer region 310. At this time, data being programmed in the buffer region 310 can be written by the SLC method. In this way, data may be programmed in the first and second buffer regions 312 and 314 by a plurality of page units. This procedure is represented by a data path (② and ③).

To program data stored in the second buffer region 314 to a target region of the main region 320 by a plurality of page units, a read operation with respect to the second buffer region 314 has to be performed first. Thus, a plurality of pages stored in the second buffer region 314 is sensed by the page buffer 330. This procedure is represented by a data path (④). Data of the sensed pages is stored in a plurality of latches (not illustrated) included in the inside of the page buffer 330 to be maintained. A read operation with respect to the buffer region 310 may be controlled by an external command of the nonvolatile memory device 300.

If a read operation with respect to the second buffer region 314 is completed, the nonvolatile memory device 300 is provided with a write command for programming the read pages in the main region 340. The write command may include a target address corresponding to a target region. The page buffer 330 can program a plurality of pages in the target region according to the MLC method. For example, a plurality of pages read from the second buffer region 314 can be programmed at the same time. The page buffer 330 can repeat this program procedure during a plurality of operations. This procedure is represented by a data path (⑤).

In the case that a program operation with respect to the data path (⑤) is finished, the nonvolatile memory device 300 performs a program operation with respect to the main region 320, using data programmed in the first buffer region 312. It is likely that some parts of pages of a memory block including a page programmed last among memory cells constituting the main region 320 are in a state not programmed, that is, an open state. The nonvolatile memory device 300 performs a program with respect to pages which are in an open state to make all the pages of the corresponding memory block exist as a programmed state, that is, a close state. This procedure is represented by a data path (⑥ and ⑦).

As described above, in the case of a program method in accordance with example embodiments of inventive concepts, write data being input from the outside is not directly programmed in the main region 320 from the page buffer 330. That is, since after programming write data in the second buffer region 314 of the SLC program method, the write data is reprogrammed in the main region 320, a write speed of the nonvolatile memory device 300 may be improved. The program method represented by the data path (③ and ④) may be called an OBP (on chip buffered program) method. The OPB method is that data is written in memory cells of the single level method having a high write speed first and then the written data is moved to memory cells of the multi level method to be written therein. Thus, write speed may be improved as compared with directly write data in the multi level memory cells from the page buffer 330.

Figure 7:
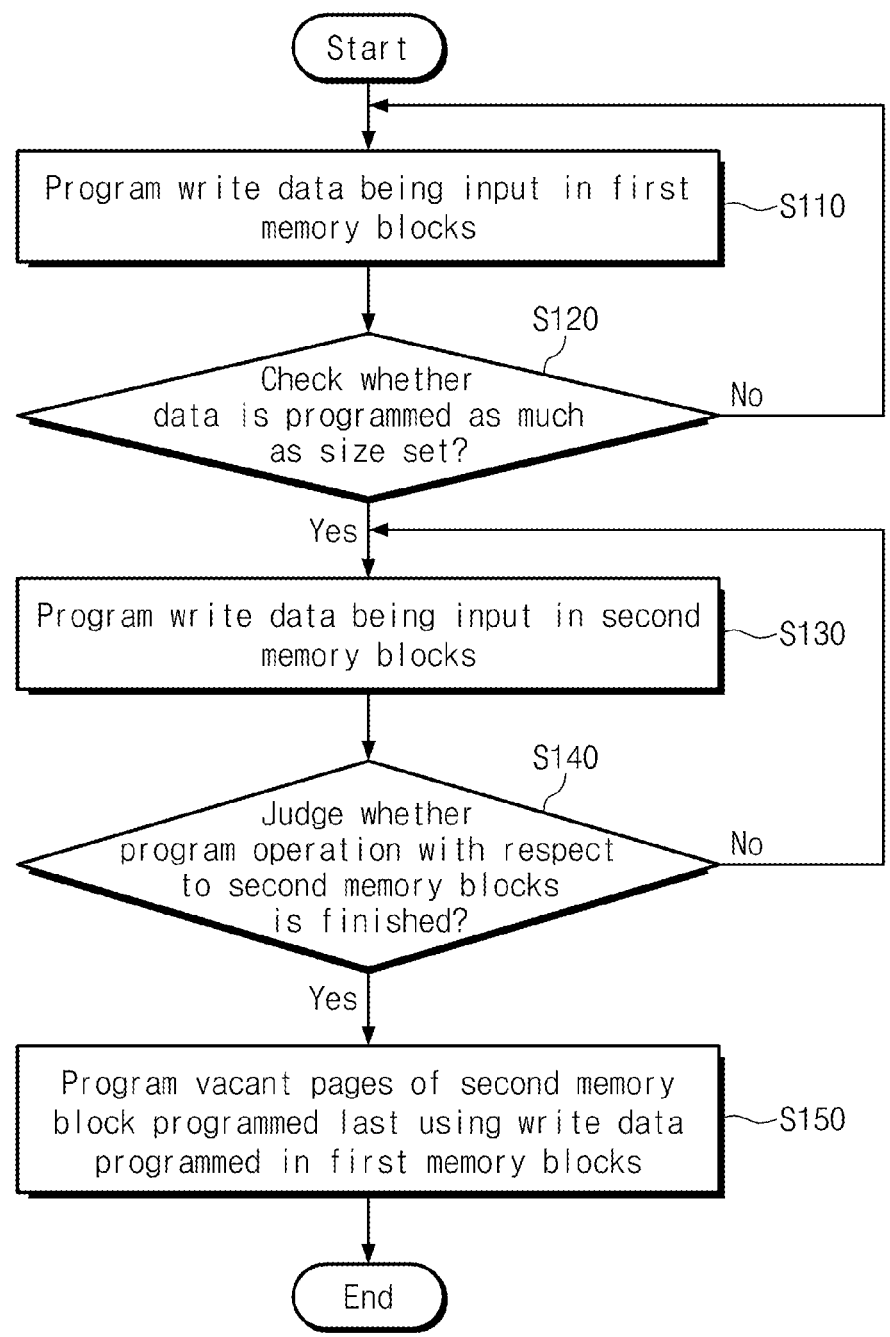
FIG. 7 is a flow chart illustrating a program method of a nonvolatile memory device in accordance with example embodiments of inventive concepts.

FIG. 7 is a flow chart illustrating a program method of a nonvolatile memory device in accordance with example embodiments of inventive concepts. Referring to FIG. 7, in a program operation of data being input from the outside, a method of programming all open pages of a memory block programmed last is illustrated. This is performed using data programmed in the first memory blocks managed by the single level cell method as much as a size of erase unit of second memory blocks managed by a multi level cell method.

In a operation 5110, the memory controller 210 may control the nonvolatile memory device 220 so that write data being input from the outside is programmed in the first memory blocks constituting the buffer region 222. A size of the write data being programmed in the first memory blocks may be set according to a size of erase unit of the main region 224. For example, if memory blocks constituting the main region 224 are managed by the triple level cell method and erased by block unit, a program operation may be performed on three first memory blocks managed by the single level cell method.

In a operation S120, the memory controller 210 checks whether data as much as a size set is programmed in the first memory blocks. If write data being input is smaller than the size set, the memory controller 210 controls the nonvolatile memory device 220 so that a program operation with respect to the first memory blocks is additionally performed. That is, the memory controller 210 controls the nonvolatile memory device 220 so that write data being newly input is subsequently programmed in the first memory blocks while maintaining the write data already written in the first memory blocks. In the case that write data is continuously input even after data as much as the size set is programmed, the procedure goes to a operation S130.

In the operation S130, the memory controller 210 controls the nonvolatile memory device 220 so that write data being input is programmed in the second memory blocks constituting the main region 224. In the operation S130, as described above, the page buffer 130 writes write data in the second memory blocks according to a control of the control logic 150.

In a operation S140, the memory controller 210 judges whether a program operation with respect to the second memory blocks is finished. For example, in the case that a program operation is not performed during a certain period of time, the memory controller 210 may judge that a program with respect to the second memory blocks is finished. In the case that it is judged that a program with respect to the second memory blocks is finished, the procedure goes to a operation S150.

In the operation S150, the memory controller 210 programs data programmed in the first memory blocks to open pages of a specific memory block among the second memory blocks. The specific memory block is a memory block including a page programmed last. It is likely that among pages of the memory block, some parts of the pages are in a programmed state and some other parts of the pages are in an open state. Thus, the memory controller 210 controls the nonvolatile memory device 220 so that a program operation is performed on all the pages of open state, using data programmed in the first memory blocks. Since the program operation is performed immediately after it is judged that a program with respect to the second memory blocks is finished, pages that exist as an open state can be changed to pages of a close state, that is, a programmed state, in a short space of time.

According to the program method of example embodiments of inventive concepts described through the flow chart, since in a program operation with respect to the nonvolatile memory device 220, a memory block of which some pages exist as an open state can be changed to a memory block of a close state in a short space of time, an EPI limitation may be solved. That is, since deterioration of a memory cell that exists as an open state for a long time can be limited and/or prevented, reliability and performance of the data of the nonvolatile memory device 220 may be improved.

Figure 8:
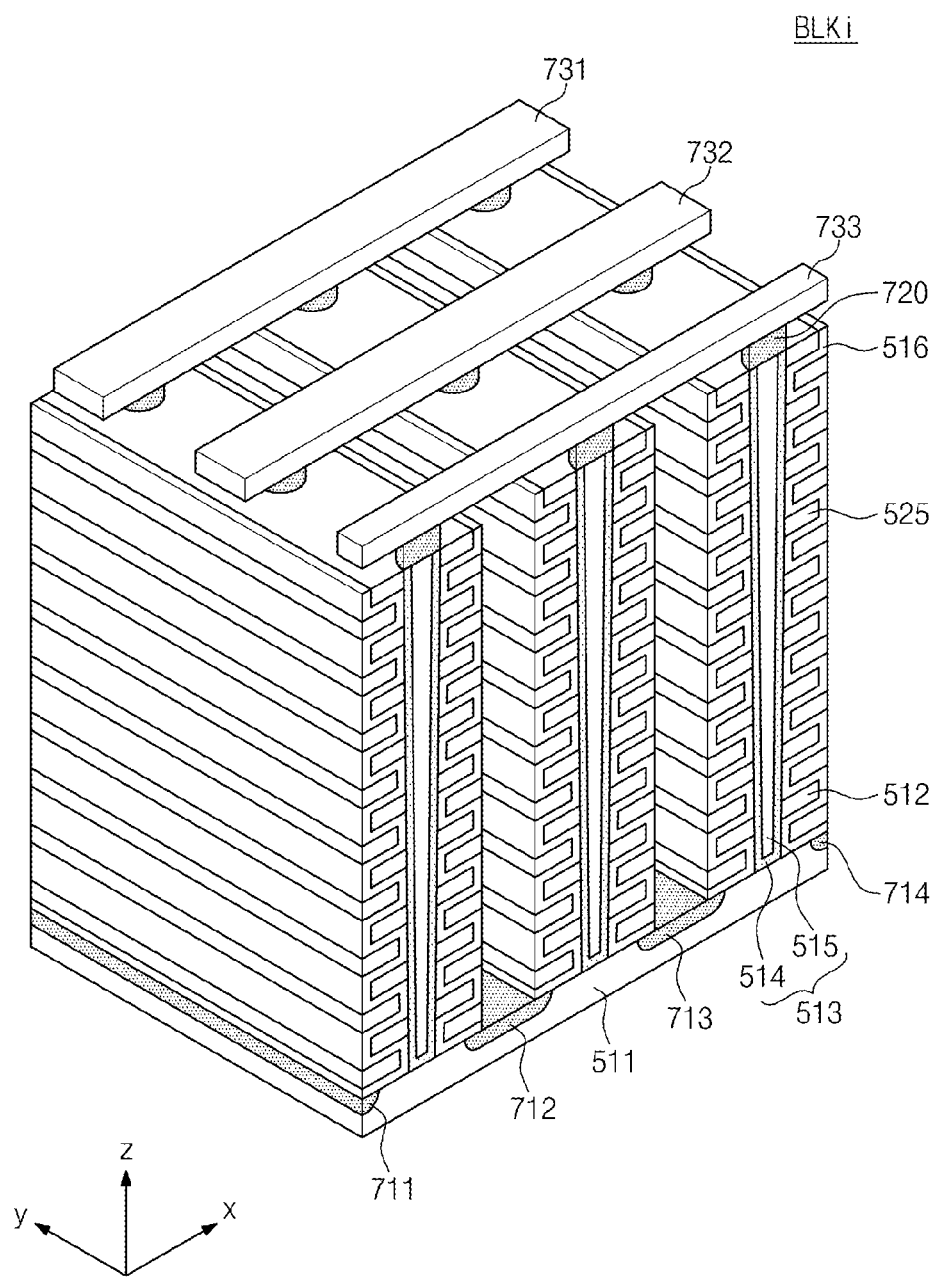
FIG. 8 is a perspective view illustrating a structure of a memory block constituting a cell array of FIG. 1.

FIG. 8 is a perspective view illustrating a structure of a memory block BLKi constituting a cell array of FIG. 1. Referring to FIG. 8, the memory block BLKi includes structures extending along first through third directions (y, z, x).

First, a substrate 511 for forming a memory block is provided. The substrate 511 may be a well having a first conductivity type. For example, the substrate 511 may be a P-well formed by implanting a group III element such as boron B. The substrate 511 may be a pocket P-well being provided in an N-well. It is assumed that the substrate 511 is a P-well or a pocket P-well. However, the substrate 511 is not limited to have a P-conductivity.

A plurality of doping regions 711~714 extending along the first direction (y) is provided in the substrate 511. The doping regions 711~713 are spaced a desired (and/or alternatively predetermined) distance apart from one another along the third direction (x). The doping regions 711~714 have a second conductivity type different from the substrate 511. For example, the doping regions 711~714 may have an N-type conductivity type. It is assumed that the doping regions 711~714 have an N-type conductivity type. However, the doping regions 711~714 is not limited to have an N-type conductivity type.

A plurality of insulating materials 512 is sequentially provided on the substrate 511 along the second direction (z) between adjacent two doping regions among the doping regions 711~713. The insulating materials 512 are spaced a desired (and/or alternatively predetermined) distance apart from one another along the second direction (z) to be provided. The insulating materials 512 extend along the first direction (y). The insulating materials 512 may include an insulating material such as a silicon oxide layer.

A plurality of pillars sequentially disposed along the first direction (y) and penetrating the insulating materials 512 along the second direction (z) is provided between adjacent two doping regions among the doping regions 711~713. The pillars may penetrate the insulating materials 512 to contact the substrate 511.

Channel layers 514 may include semiconductor material (for example, silicon) having the first conductivity type. For example, the channel layers 514 may include semiconductor material (for example, silicon) having the same conductivity type as the substrate 511. It is assumed that the channel layers 514 include P-type silicon. However, the channel layers 514 are not limited to include P-type silicon. For example, the channel layers 514 may include intrinsic semiconductor not having conductivity type.

An information storage layer being provided on a top surface of an insulating material located on the uppermost part among the insulating materials 512 may be removed. An information storage layer being provided on a side facing the pillars among sides of the insulating materials 512 may be removed.

A plurality of drains 720 is provided on the pillars. The drains 720 may include semiconductor material (for example, silicon) having the second conductivity type. The drains 720 may include semiconductor material (for example, silicon) having an N conductivity type. It is assumed that the drains 720 include N-type silicon. However, the drains 720 are not limited to include N-type silicon. The drains 720 may extend to an upper portion of the channel layers 514 of the pillars.

Bit lines 731, 732 and 733 that extend along the third direction (x) and are spaced a desired (and/or alternatively predetermined) distance apart from one another along the first direction (y) are provided on the drains 720. The bit lines 731, 732 and 733 are connected to the drains 720. The bit lines 731, 732 and 733 may be connected to the drains 720 through contact plugs (not illustrated). The bit lines 731, 732 and 733 may include metallic conductive materials. The bit lines 731, 732 and 733 may include nonmetallic conductive materials such as polysilicon.

The memory block BLKi may include a plurality of conductive materials 525 (e.g., word line layers) that are alternately stacked in the second direction (z) between the insulating materials 512. The pillars 513 extend in the second direction (z) through the conductive materials 525. Each of the pillars 513 constitutes one cell string together with adjacent information storage layers 516 and adjacent conductive materials. That is, the pillars 513 form a plurality of cell strings together with the adjacent information storage layers 516 and the adjacent conductive materials. Each cell string may include a plurality of memory cells stacked on top of each other between at least one ground select transistor and at least one string select transistor. In FIG. 8, the ground select transistor may be defined by respective portions of the channel layer 514 and the information storage layers 516 that are adjacent to the lowermost conductive material 525. In FIG. 8, the string select transistor may be defined by respective portions of the channel layer 514 and the information storage layers 516 that are adjacent to the uppermost conductive material 525. In FIG. 8, the memory cells be defined by portions of the channel layer 514 and the information storage layers 516 that are adjacent to the conductive material 525 between the uppermost conductive material 525 layer and the lowermost conductive material 525.

Figure 9:
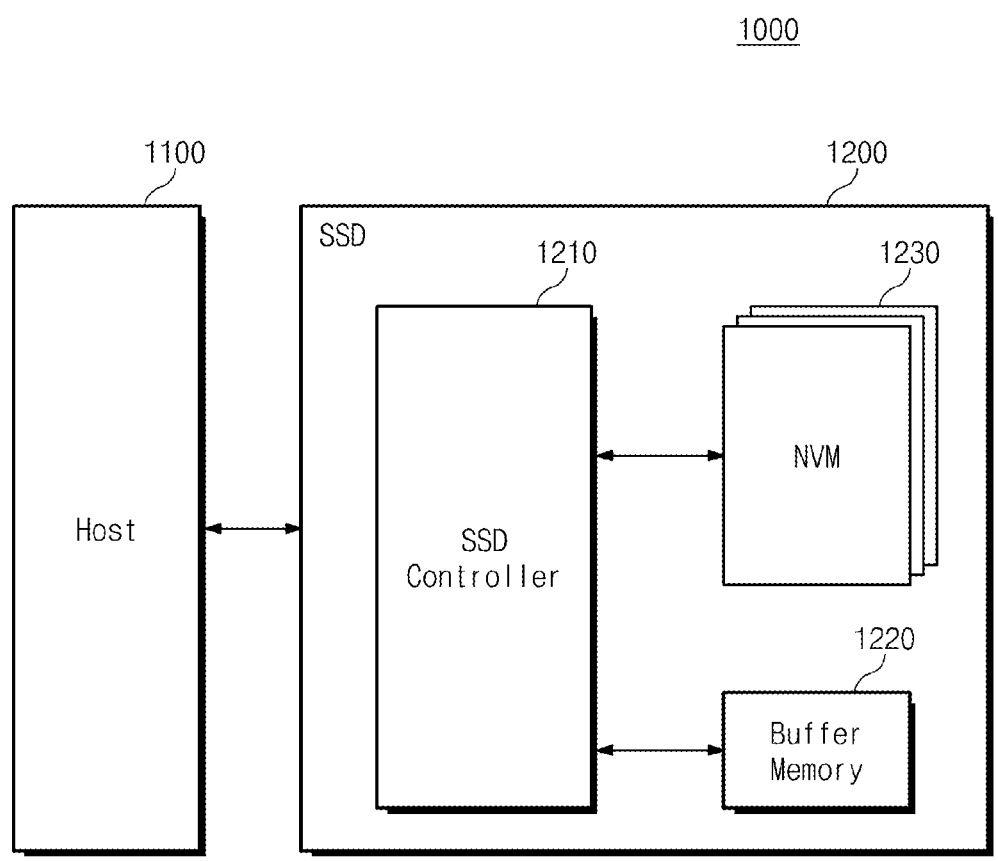
FIG. 9 is a block diagram illustrating a user device including a SSD (solid state disk) in accordance with example embodiments of inventive concepts.

FIG. 9 is a block diagram illustrating a user device including a SSD (solid state disk) in accordance with example embodiments of inventive concepts. Referring to FIG. 9, a user device 1000 includes a host 1100 and a SSD 1200. The SSD 1200 includes a SSD controller 1210, a buffer memory 1220 and a nonvolatile memory device 1230.

The SSD controller 1210 provides a physical connection between the host 1100 and the SSD 1200. That is, the SSD controller 1210 corresponds to a bus format of the host 1100 to provide an interfacing with the SSD 1200. The SSD controller 1210 decodes a command being provided from the host 1100. According to a decoded result, the SSD controller 1210 accesses the nonvolatile memory device 1230. The bus format of the host 1100 may include a USB (universal serial bus), a SCSI (small computer small interface), a PCI-E (PCI-express), an ATA (advanced technology attachment), a serial-ATA, a parallel-ATA, a SAS (serial attached SCSI), etc.

The buffer memory 1220 temporarily stores write data being provided from the host 110 or data read from the nonvolatile memory device 1230. In the case that when a read request of the host 1100 occurs, data that exists in the nonvolatile memory device 1230 is cached, the buffer memory 1220 supports a cache function of directly providing cached data to the host 1100. Generally, data transmission speed by the bus format (for example, SATA or SAS) of the host 1100 is much higher than a transmission speed of a memory channel of the SSD 1200. That is, in the case that an interface speed of the host 1100 is very high, performance degradation caused by a speed difference can be reduced and/or minimized by providing the large-capacity buffer memory 1220.

The buffer memory 1220 may be provided by a synchronous DRAM (SDRAM) to provide a sufficient buffering in the SSD 1200 being used as a large-capacity auxiliary memory device. However, the buffer memory 1220 may not be limited thereto.

The nonvolatile memory device 1230 is provided as a storage medium of the SSD 1200. For example, the nonvolatile memory device 1230 may be provided by a NAND flash memory having a high storage capacity. The nonvolatile memory device 1230 may be constituted by a plurality of memory devices. In this case, the memory devices are connected to the SSD controller 1210 by a channel unit. A NAND flash memory was described as the storage medium of the SSD 1200 but other nonvolatile memory devices may be used as the storage medium of the SSD 1200. For example, a PROM, a MRAM, a ReRAM, a FRAM, a NOR flash memory, etc. may be used as the storage medium. A memory system in which different kinds of memory devices are mixed can be applied to the storage medium. The nonvolatile memory device 1230 includes a buffer region for a buffer program operation and a main region for a main program operation.

In a write operation, the SSD controller 1210 can perform the program method described with reference to FIG. 4 with respect to the nonvolatile memory device 1230. The SSD 1200 can sufficiently provide accessible time by the host 1100. In the case of using a write method of according to example embodiments of inventive concepts, pages that may remain as an open state after a write operation can be changed to pages of a close state (e.g., a programmed state) in a very short time. Thus, since there is no need to manage a EPI characteristic, the SSD 1200 of high performance may be provided. In a write operation of continuous data, performance of the SSD 1200 may be improved.

Figure 10:
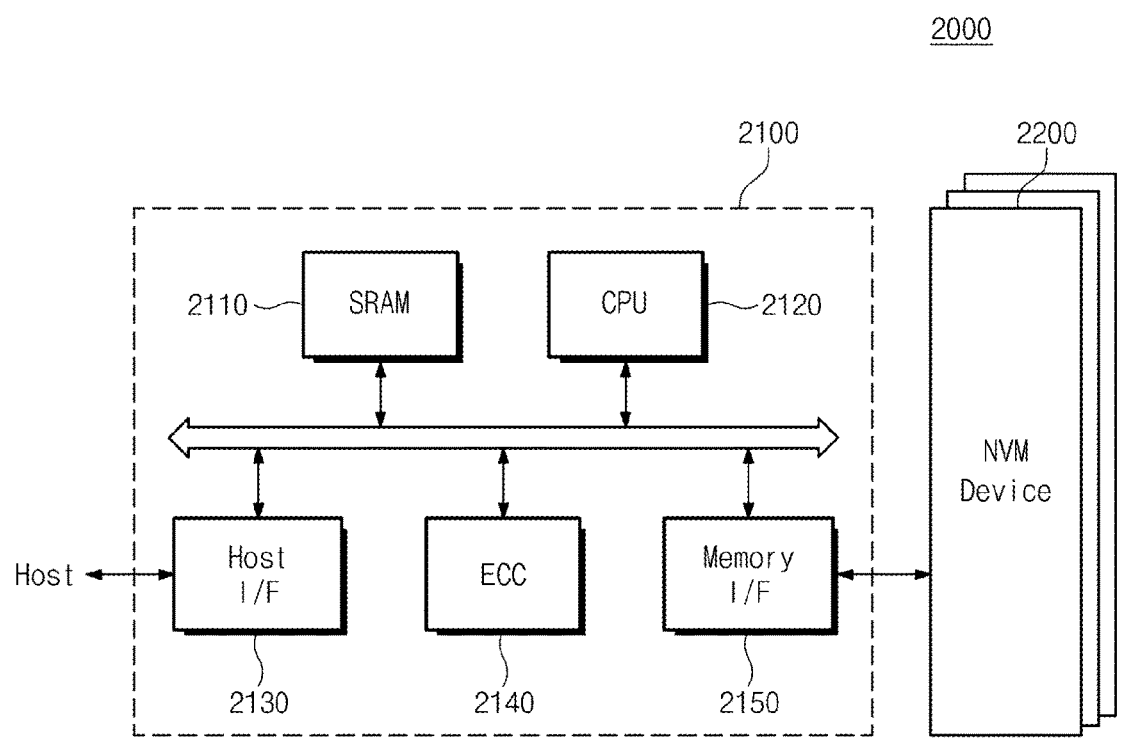
FIG. 10 is a block diagram illustrating a memory system in accordance with example embodiments of inventive concepts.

FIG. 10 is a block diagram illustrating a memory system 2000 in accordance with example embodiments of inventive concepts. Referring to FIG. 10, the memory system 2000 may include a memory controller 2100 and a nonvolatile memory device 2200.

The nonvolatile memory device 2200 may be constituted to be the same with any one of the nonvolatile memory devices 220 of FIGS. 5A through 5D. Thus, a detailed description of the nonvolatile memory device 2200 is omitted.

The memory controller 2100 may be configured to control the nonvolatile memory device 2200. A SRAM 2110 may be used as a working memory of CPU 2120. A host interface 2130 may include data exchange protocols of a host which contacts the memory controller 2100. An error correction circuit 2140 included in the memory controller 2100 can detect and correct an error included in data read from the nonvolatile memory device 2200. The memory interface 2150 can interface with the nonvolatile memory device 2200. A CPU 2120 can perform an overall control operation for data exchange of the memory controller 2100. Although not illustrated in the drawing, the memory system 2000 may further include a ROM (not illustrated) storing code data for an interfacing with the host.

The memory controller 2100 may be configured to communicate with the outside (for example, host) through one of various interface protocols such as USB, PCI-E, SAS, SATA, PATA, SCSI, ESDI and IDE.

The memory system 2000 may be applied to one of a computer, a portable computer, an ultra mobile PC (UMPC), a workstation, a net-book, a personal digital assistants (PDA), a web tablet, a wireless phone, a mobile phone, a smart phone, a digital camera, a digital audio recorder, a digital audio player, a digital picture recorder, a digital picture player, a digital video recorder, a digital video player, a device that can transmit and receive information in a wireless environment, various user devices constituting a home network.

In a write operation, the memory controller 2100 can perform the program method described with reference to FIG. 4 on the nonvolatile memory device 2200. In the case of using a write method of example embodiments of inventive concepts, pages that may remain as an open state after a write operation can be changed to pages of a close state (e.g., a programmed state) in a very short time. Thus, since there is no need to manage a EPI characteristic, the memory system 2000 of high performance may be provided. In a write operation of continuous data, performance of the memory system 2000 may be improved.

Figure 11:
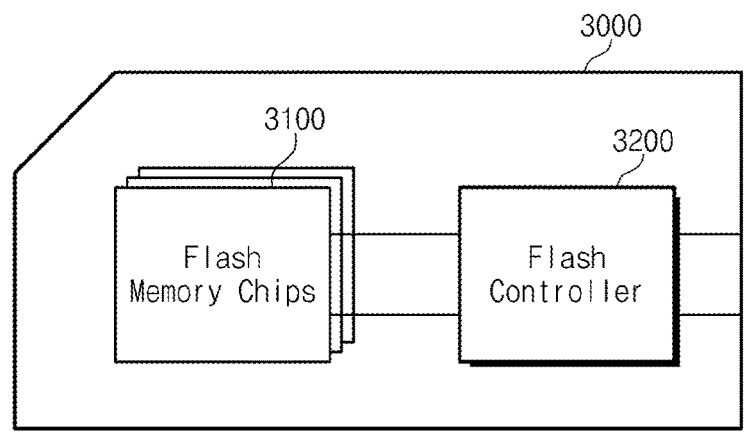
FIG. 11 is a block diagram illustrating a data storage device in accordance with example embodiments of inventive concepts.

FIG. 11 is a block diagram illustrating a data storage device 3000 in accordance with example embodiments of inventive concepts. Referring to FIG. 11, the data storage device 3000 may include flash memory chips 3100 and a flash controller 3200. The flash controller 3200 can control the flash memory chips 3100 on the basis of control signals received from the outside of the data storage device 3000.

The flash memory chips 3100 may be constituted to be the same with the nonvolatile memory devices 220 of FIG. 3 or FIGS. 5A through 5D and may be constituted by a multi chip. Each of the flash memory chips 3100 may be constituted by any one of a stack flash structure in which arrays are stacked with multiple layer, a flash structure without a source-drain, a pin-type flash structure and a three-dimensional flash structure.

The data storage device 3000 may constitute a memory card device, a SSD device, a multimedia card device, a SD device, a memory stick device, a hard disk drive device, a hybrid drive device, or a general-purpose serial bus flash device. For example, the data storage device 3000 can constitute a card satisfying industrial standards for using a user device such as a digital camera, a personal computer, etc.

In a write operation, the flash controller 3200 can perform the program method described with reference to FIG. 4 on the flash memory chips 3100. In the case of using a write method of example embodiments of inventive concepts, pages that may remain as an open state after a write operation can be changed to pages of a close state (e.g., a programmed state) in a very short time. Thus, since there is no need to manage a EPI characteristic, the data storage device 3000 of high performance may be provided. In a write operation of continuous data, performance of the data storage device 3000 may be improved.

Figure 12:
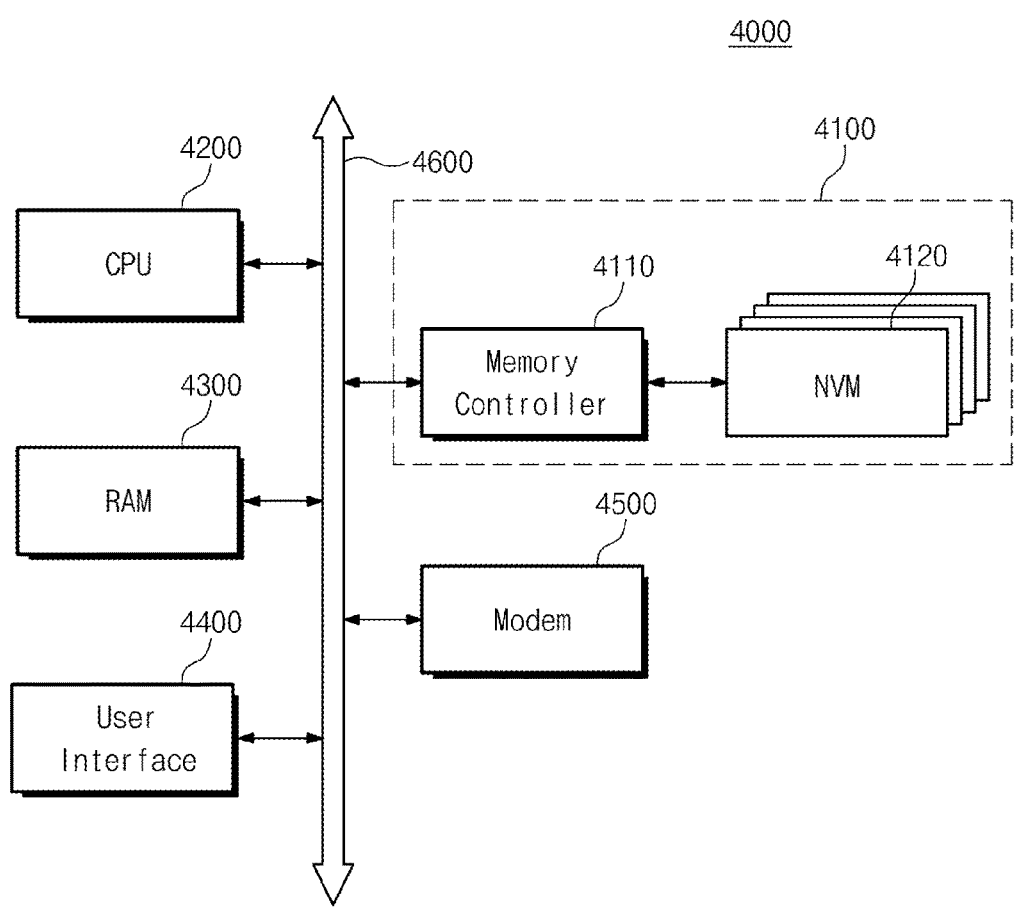
FIG. 12 is a drawing illustrating a constitution of a computing system including a storage device in accordance with example embodiments of inventive concepts.

FIG. 12 is a drawing illustrating a constitution of a computing system 4000 including a storage device in accordance with example embodiments of inventive concepts. Referring to FIG. 12, the computing system 4000 may include a storage device 4100, a microprocessor 4200, a RAM 4300, a user interface 4400 and a modem 4500 such as a baseband chipset that are electrically connected to a bus 4600.

A constitution of the storage device 4100 is substantially the same as the nonvolatile memory devices 220 of FIGS. 5A through 5D and flash memory of according to example embodiments of inventive concepts may be constituted by any one of a stack flash structure in which arrays are stacked with multiple layer, a flash structure without a source-drain, a pin-type flash structure and a three-dimensional flash structure.

In the case that the computing system 4000 is a mobile device, a battery for supply an operation voltage of the computing system 4000 may be further provided. Although not illustrated in the drawing, the computing system 4000 may further include an application chipset, a camera image processor CIS, a mobile DRAM, etc. A memory controller 4110 and a flash memory device 4120 may constitute a SSD (solid state drive) which uses a nonvolatile memory to store data.

In example embodiments of inventive concepts, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In example embodiments of inventive concepts, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

According to example embodiments of inventive concepts, since the storage device can manage time that a memory block is erased and all the pages are programmed shortly, an EPI problem can be fundamentally solved.

The above-disclosed subject matter is to be considered illustrative, and not restrictive, and the appended claims are intended to cover all such modifications, enhancements, and other variations, which fall within the true spirit and scope of example embodiments of inventive concepts. Thus, to the maximum extent allowed by law, the scope of inventive concepts is to be determined by the broadest permissible interpretation of the following claims and their equivalents, and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A method of operating a memory controller of a storage device including a nonvolatile memory device comprising:
   performing a buffer program operation that includes storing a size set of data in a buffer region of the nonvolatile memory device, the size set of data corresponding to an erase unit of a main region of the nonvolatile memory device;
   performing a main program operation that includes storing data in the main region of the nonvolatile memory device after the buffer program operation; and
   performing a closing program operation that includes writing data stored in the buffer region to open pages of a memory block of the main region including a page programmed last after the main program operation is finished.

2. The method of claim 1, wherein
   the performing the buffer program operation includes managing the buffer region using a single level cell method, and
   the performing the main and closing program operations include managing the main memory region using a multi level cell method.

3. The method of claim 2, wherein the performing the main and closing program operations include managing the main region using a triple level cell (TLC) method.

4. The method of claim 1, wherein the buffer and main program operations include using continuously input data.

5. The method of claim 1, wherein
   the nonvolatile memory device includes a plurality of memory blocks on a substrate,
   the memory blocks each include a plurality of strings on the substrate, and
   each of the strings include a plurality of memory cells stacked on top of each other in a direction perpendicular to the substrate.

6. The method of claim 1, wherein the closing program operation is performed after the main program operation is finished.

7. The method of claim 1, wherein the closing program operation is performed within a threshold time after the main program operation is finished.

8. The method of claim 7, wherein the threshold time is less than an erase program interval of the nonvolatile memory device.

9. A method of operating a nonvolatile memory device including first and second buffer regions managed by a single level cell method and a main region managed by a multi level cell method, the method comprising:
   performing a first program operation that includes storing a size set of data in the first buffer region;
   performing a second program operation that includes storing data in the second buffer region;
   performing a third program operation that includes storing data written in the second buffer region in the main region; and
   performing a fourth program operation that includes writing data programmed in the first buffer region in open pages of a memory block including a page programmed in the main region last.

10. The method of claim 9, wherein the size set of data corresponds to an erase unit of the main region.

11. The method of claim 9, wherein the data is continuously input in the first buffer region, second buffer region, and main region, respectively, during the performing the first to third program operations.

12. The method of claim 9, wherein
   the nonvolatile memory device includes a plurality of memory blocks on a substrate, the memory blocks each include a plurality of strings on the substrate, and
   each of the strings include a plurality of memory cells stacked on top of each other in a direction perpendicular to the substrate.

13. The method of claim 9, wherein the fourth program operation is performed immediately or within a threshold time after the third program operation is finished.

14. The method of claim 13, wherein the threshold time is an erase program interval of the nonvolatile memory device.

15. A method of programming a nonvolatile memory device including a plurality of memory blocks, the memory blocks including first memory blocks and second memory blocks that each include memory cells, the method comprising:
   programming data into the first memory blocks until a size set of data corresponding to an erase unit of the second memory blocks is programmed in the first memory blocks;
   programming data into the second memory blocks, the programming data into the second memory blocks resulting in closed pages and at least one open page in the second memory blocks, the closed pages being programmed with data, the at least one open page being not programmed with data; and programming the at least one open page in the second memory blocks after the programming data into the second memory blocks, the programing the at least one open page in the second memory blocks including using at least part of the data stored in the first memory blocks until the at least one open page becomes fully programmed and is included as one of the closed pages in the second memory blocks.

16. The method of claim 15, wherein
the programming data into the first memory blocks includes programming the memory cells in the first memory blocks to each store N bit(s) of data per memory cell,
the programming data into the second memory blocks includes programming the memory cells of the closed pages to each store X bits of data per memory cell,
the programming the at least one open page includes programming the memory cells of the at least one open page to each store X bits of data per memory cell,
N is an integer greater than or equal to 1, and
X is an integer greater than N.

17. The method of claim 15, wherein the memory cells of the first and second memory blocks are organized into a plurality of strings, and
each of the strings include a group of the memory cells that are stacked on top of each other in a vertical direction.

18. The method of claim 15, wherein
the nonvolatile memory device is part of a storage device that includes a memory controller that is configured to control the nonvolatile memory device,
the programming data into the first memory blocks includes using the memory controller to control the nonvolatile memory device so that data received from a host external to the storage device is written into the first memory blocks until the size set of data is programmed in the first memory blocks,
the programming data into the second memory blocks includes using the memory controller to control the nonvolatile memory device so that data received from the host is programmed into the second memory blocks, resulting in the closed pages and the at least one open page;
the programming the at least one open page in the second memory blocks includes using the memory controller to control the nonvolatile memory device during the programming the at least one open page in the second memory blocks and immediately performing the programming the at least one open page after the programming data into the second memory blocks is finished.

* * * * *